United States Patent
Watanabe et al.

(10) Patent No.: US 10,923,271 B2
(45) Date of Patent: Feb. 16, 2021

(54) CORE AND TRANSFORMER

(71) Applicant: FUJI ELECTRIC CO., LTD., Kanagawa (JP)

(72) Inventors: Takeshi Watanabe, Tokyo (JP); Kenji Okamoto, Tokyo (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 150 days.

(21) Appl. No.: 15/987,304

(22) Filed: May 23, 2018

(65) Prior Publication Data

US 2019/0035540 A1   Jan. 31, 2019

(30) Foreign Application Priority Data

Jul. 27, 2017  (JP) .............. JP2017-145763

(51) Int. Cl.
| | | |
|---|---|---|
| *H01F 27/34* | (2006.01) | |
| *H01F 27/32* | (2006.01) | |
| *H01F 27/24* | (2006.01) | |
| *H01F 27/28* | (2006.01) | |
| *H01F 27/255* | (2006.01) | |
| *H02M 3/335* | (2006.01) | |

(52) U.S. Cl.
CPC ............ *H01F 27/34* (2013.01); *H01F 27/24* (2013.01); *H01F 27/255* (2013.01); *H01F 27/28* (2013.01); *H01F 27/2866* (2013.01); *H01F 27/325* (2013.01); *H01F 27/327* (2013.01); *H02M 3/33523* (2013.01); *H02M 3/33584* (2013.01)

(58) Field of Classification Search
CPC .......... H01F 5/06; H01F 27/34; H01F 27/325; H01F 27/327; H01F 27/24; H01F 27/38; H01F 27/2866; H01F 27/28; H01F 27/255; H01F 27/004; H01F 27/2847; H01F 27/2823; H02M 3/33523; H02M 3/33584
USPC ................ 336/212, 221, 170, 222, 198, 208
See application file for complete search history.

(56) References Cited

U.S. PATENT DOCUMENTS

| | | | | |
|---|---|---|---|---|
| 6,310,533 | B2 * | 10/2001 | Coulombier | H01F 7/128 336/205 |
| 7,233,225 | B2 * | 6/2007 | Sato | H01F 27/255 336/200 |
| 7,646,276 | B2 * | 1/2010 | Yang | H01F 27/29 336/83 |
| 8,325,004 | B2 * | 12/2012 | Nagano | H01F 30/06 336/212 |
| 8,427,267 | B1 * | 4/2013 | Vinciarelli | H01F 27/022 336/178 |
| 9,349,521 | B2 * | 5/2016 | Tsai | H01F 27/28 |
| 2012/0146759 | A1 * | 6/2012 | Shibuya | H01F 17/043 336/221 |
| 2013/0147594 | A1 * | 6/2013 | Pan | H01F 3/00 336/208 |
| 2013/0320757 | A1 * | 12/2013 | Shinohara | H01F 37/00 307/10.1 |

(Continued)

FOREIGN PATENT DOCUMENTS

| | | |
|---|---|---|
| JP | 2004-240727 | 8/2004 |
| JP | 2011-258876 | 12/2011 |

*Primary Examiner* — Mang Tin Bik Lian
(74) *Attorney, Agent, or Firm* — IPUSA, PLLC

(57) ABSTRACT

A core is provided that includes a corner part facing a winding wound on a shaft part, the corner part being chamfered into a curved surface shape.

3 Claims, 4 Drawing Sheets

(56) References Cited

U.S. PATENT DOCUMENTS

| | | | | |
|---|---|---|---|---|
| 2014/0266528 A1* | 9/2014 | Yang | .................. | H01F 27/24 336/83 |
| 2014/0266550 A1* | 9/2014 | Turnbull | ................ | H05K 1/165 336/200 |
| 2015/0310979 A1* | 10/2015 | Pan | .......................... | H01F 3/10 336/212 |
| 2015/0318098 A1* | 11/2015 | Miyamoto | .............. | H01F 30/00 336/183 |
| 2015/0357111 A1* | 12/2015 | Sasaki | ................... | H01F 27/266 336/198 |
| 2016/0079873 A1* | 3/2016 | Inoue | ................. | H01F 27/2847 363/21.04 |

* cited by examiner

CORE AND TRANSFORMER

CROSS-REFERENCE TO RELATED APPLICATION

The present application is based on and claims the benefit of priority of Japanese Priority Application No. 2017-145763 filed on Jul. 27, 2017, the entire contents of which are hereby incorporated by reference.

BACKGROUND OF THE INVENTION

1. Field of the Invention

The present invention relates to a core and a transformer.

2. Description of the Related Art

For example, for a facility such as a data center, in order to simplify electrical equipment, a power supply system is needed that omits power receiving equipment outside the facility and directly receives relatively high system AC power of several kV or more to output DC power of a relatively low predetermined voltage (for example, 100 V). In such a power supply system, a transformer that has a high withstand voltage against a relatively high voltage of several kV or more is required.

Conventionally, in response to such a requirement for a high withstand voltage, techniques of using a space around a winding or the like are proposed such as resin sealing after parts other than a core are contained in a synthetic resin case, and providing an isolated space between a primary winding and a secondary winding (see, for example, Patent Documents 1 and 2).

However, because a power supply system in a facility as described above is required to be relatively small, a transformer having a small size to be mountable on a printed circuit board is required. Hence, for example, it is impossible to sufficiently secure the distance between a primary winding of a transformer and a corner part of the core facing the primary winding. Then, there is a possibility that required high dielectric strength cannot be secured because of partial discharge due to electric concentration that easily occurs at the corner part of the core.

In view of the above-described problem, an object is to provide a core that can achieve both a size reduction and high dielectric strength.

RELATED-ART DOCUMENTS

Patent Document

[Patent Document 1] Japanese Laid-open Patent Publication No. 2004-240727

[Patent Document 2] Japanese Laid-open Patent Publication No. 2011-258876

SUMMARY OF THE INVENTION

According to an embodiment, a core is provided that includes a corner part facing a winding wound on a shaft part, the corner part being chamfered into a curved surface shape.

According to an embodiment, a transformer is provided that includes the above-described core; a plurality of bobbins in which primary windings wound around the shaft part are sealed by resin; and a plurality of secondary windings configured such that metal plates are wound, around the shaft part, by edgewise winding, wherein the plurality of bobbins and the plurality of secondary windings are alternately arranged in an axial direction of the shaft part.

According to an embodiment, it is possible to provide a core that can achieve both a size reduction and high dielectric strength.

DETAILED DESCRIPTION OF THE PREFERRED EMBODIMENTS

In the following, an embodiment for implementing the invention will be described with reference to the accompanying drawings.

Configuration of Transformer

First, with reference to FIG. 1 and FIG. 2, a transformer 1 according to the present embodiment will be described.

Figure 1:
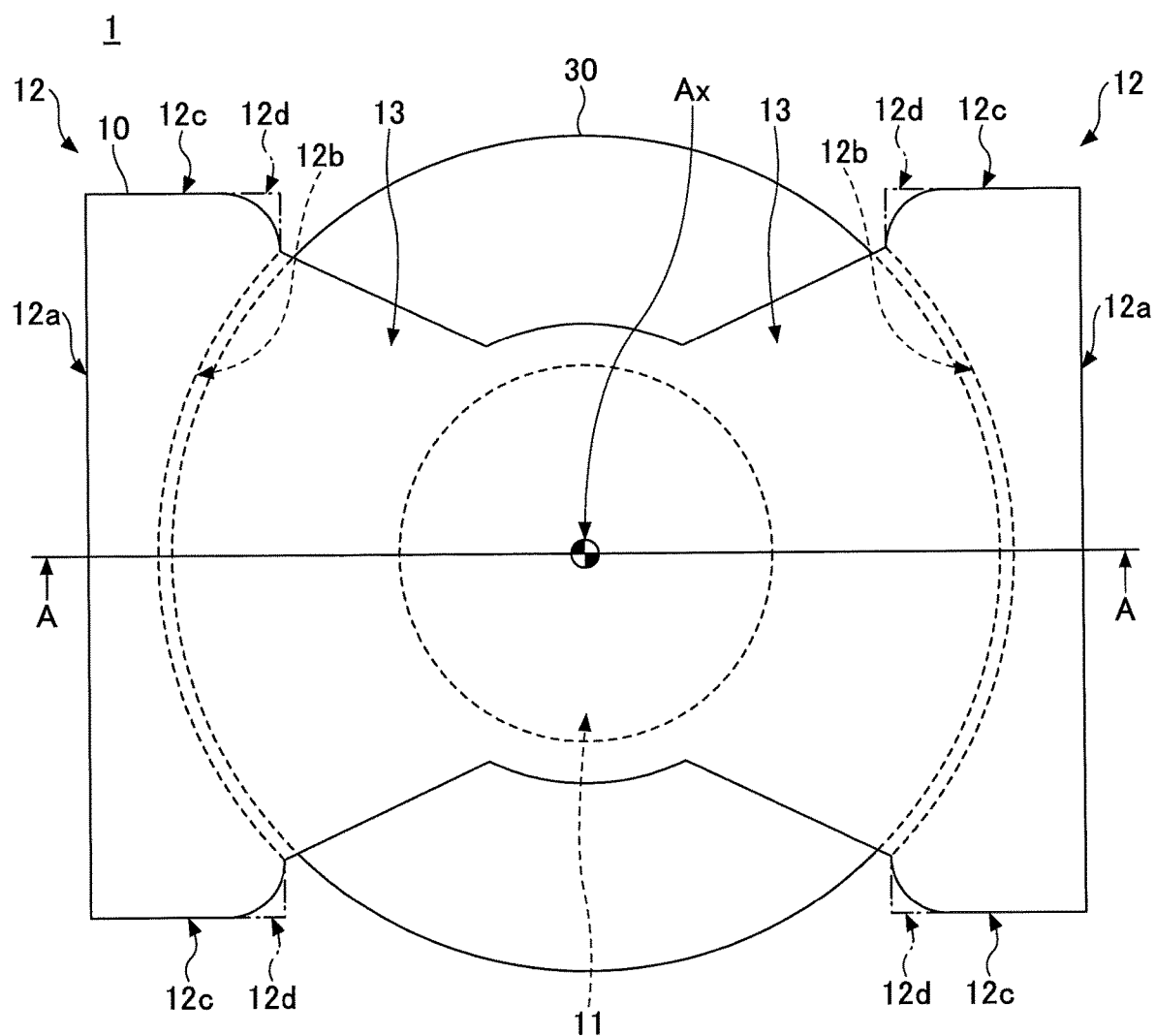
FIG. 1 is a top view illustrating an example of a configuration of a transformer according to the present embodiment.

FIG. 1 is a top view illustrating an example of a configuration of the transformer 1 according to the present embodiment. FIG. 2 is a cross-sectional view illustrating an example of the configuration of the transformer 1 according to the present embodiment. Specifically, FIG. 2 is a cross-sectional view of the transformer 1 according to the present embodiment taken along the line A-A in FIG. 1.

According to the present embodiment, for example, the transformer 1 is a step-down transformer that decreases a relatively high voltage of several kV or more to output a relatively low output voltage of, for example, 100 V, and has a relatively small size so as to be mountable on a printed circuit board used in a facility such as a data center, for example. As illustrated in FIG. 1 and FIG. 2, the transformer 1 includes a core 10, primary windings 20, and secondary windings 30.

The core 10 is made of a material having a relatively high magnetic permeability, for example, Mn—Zn ferrite. The core 10 includes a shaft part 11 around which the primary windings 20 and the secondary windings 30 are wound, leg parts 12 adjacent to the outside of the primary windings 20 and the secondary windings 30, and a linking part 13 that connects the shaft part 11 and the leg parts 12. The leg parts 12 are substantially axisymmetric with respect to the center of the shaft part 11 (specifically, the axis Ax).

The shaft part 11 has a substantially cylindrical shape centered on the axis Ax.

A cross sectional shape of the leg parts 12 as viewed in plan view is configured by outer side surfaces 12a, inner side surfaces 12b, and connection side surfaces 12c. The outer side surfaces 12a are configured by substantially parallel planes between the pair of leg parts 12. The inner side surfaces 12b are configured by curved surfaces along the outer edges of the primary windings 20 and the secondary windings 30. The connection side surfaces 12c are configured by planes that are substantially orthogonal to the outer side surfaces 12a and connect the outer side surfaces 12a and the inner side surfaces 12b. In the following, in plan view, a direction in which the shaft part 11 and the pair of leg parts 12 are lined up is referred to as an arrangement direction, and a direction orthogonal to the arrangement direction is referred to as a width direction. The dimension of the leg parts 12 in the width direction is larger than the outer diameter of the shaft part 11.

Figure 2:
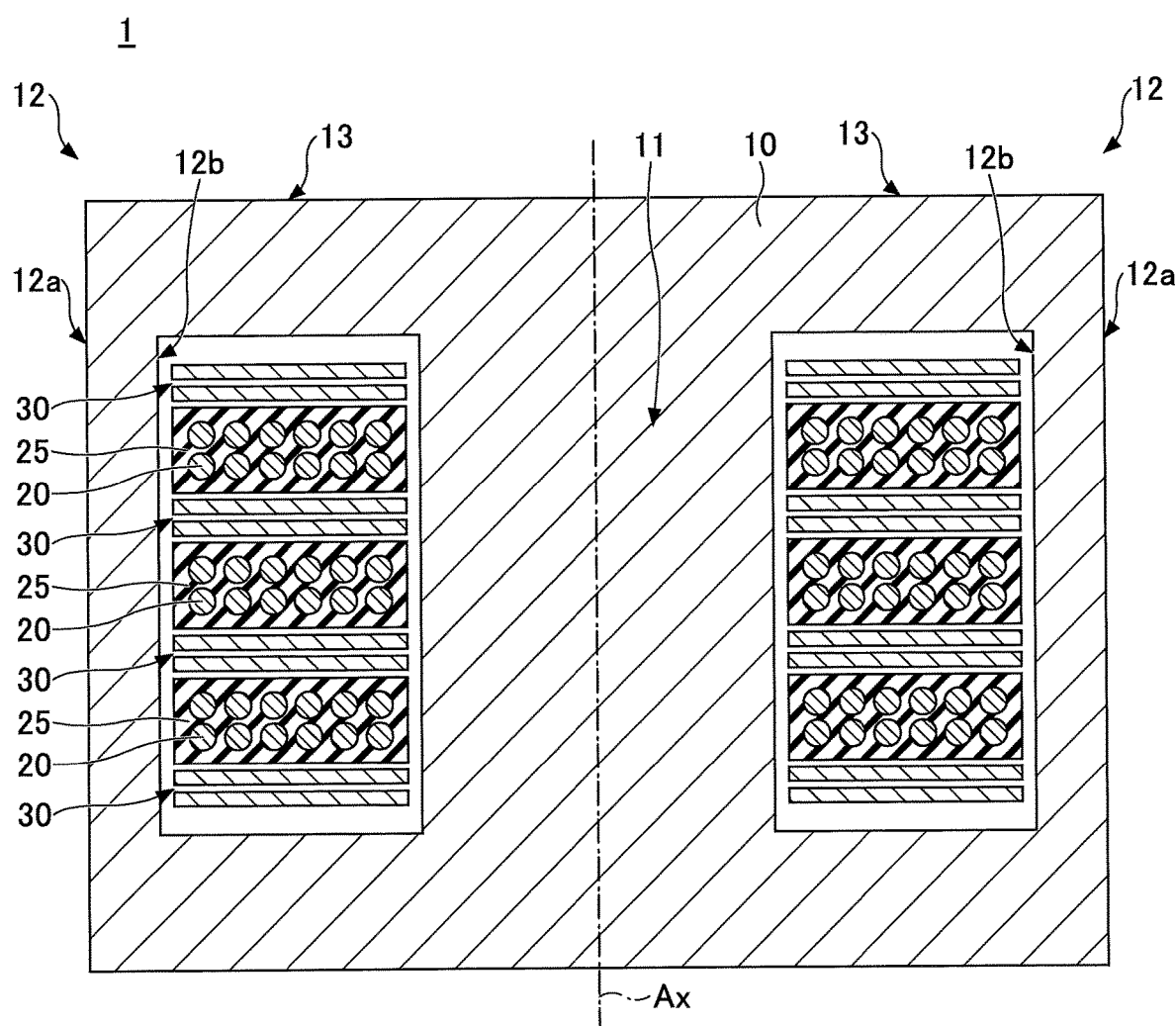
FIG. 2 is a cross-sectional view illustrating an example of the configuration of the transformer according to the present embodiment.

Further, the corner parts 12d, which are connection portions between the inner side surfaces 12b and the connection side surfaces 12c, face the primary windings 20 and the secondary windings 30, and are chamfered into curved surface shapes with respect to substantially right-angled shapes indicated by dot-dash lines in FIG. 2. Effects of the chamfers will be described later below.

The linking part 13 has a substantially fan shape that connects the shaft part 11 and the leg parts 12 having a larger dimension in the width direction than the outer diameter of the shaft part 11 in plan view.

Note that the core 10 has a configuration that can be divided into two at the vicinity of approximately the middle in the axial direction of the shaft part 11.

For the primary windings 20, round wires are wound around the shaft part 11. The primary windings 20 may be three-layer insulated wires (reinforced insulated wires). Thereby, the dielectric strength between the primary windings 20 and the core 10 and the secondary windings 30 can be enhanced with respect to a relatively high input voltage of several kV or more applied to the transformer 1.

Further, the primary windings 20 are sealed by resin. The primary windings 20 are sealed (enclosed) by substantially doughnut-shaped bobbins 25 each of which has a cylindrical through hole slightly larger than the shaft part 11 in the vicinity of the central axis of the substantially cylindrical shape. The bobbins 25 may be formed of a resin material having properties such as a high dielectric strength, a low permittivity, a low hygroscopic property, and a high heat resistance. For example, the bobbins 25 may be formed of an olefin-based thermosetting resin or the like. Thereby, the dielectric strength can be further enhanced by effects of resin sealing of the primary windings 20 with respect to a relatively high input voltage of several kV or more applied to the transformer 1. Also, because the transformer 1 is required to have a small size enough to be mountable on a printed circuit board as described above, it is difficult to secure a sufficient spatial distance between the core 10 and the primary windings 20. Specifically, in a case where dielectric strength against an input voltage of several kV or more is secured by a spatial distance, approximately 40 mm is required between the core 10 and the primary windings 20. However, for the transformer 1 having a size mountable on a printed circuit board, generally, only approximately several mm can be secured for the spatial distance between the core 10 and the primary windings 20.

With respect to the above, at least part of the shortage of the spatial distance can be compensated by resin sealing of the primary windings 20.

The secondary windings 30 are configured in such a manner that metal plates (rectangular wires) are wound, around the shaft part 11, by edgewise winding.

Further, the plurality of bobbins 25, enclosing the primary windings 20, and the plurality of secondary windings 30 are alternately stacked (arranged) in the axial direction of the shaft part 11 by a sandwich structure. In the present embodiment, three primary windings 20 and four secondary windings 30 are alternately stacked in the axial direction in a manner in which the secondary windings 30 are disposed at the axial end parts of the shaft part 11 in the axial direction.

Characteristic Effects of Transformer

Next, with reference to FIG. 3, characteristic effects of the transformer 1 according to the present embodiment will be described.

Figure 3:
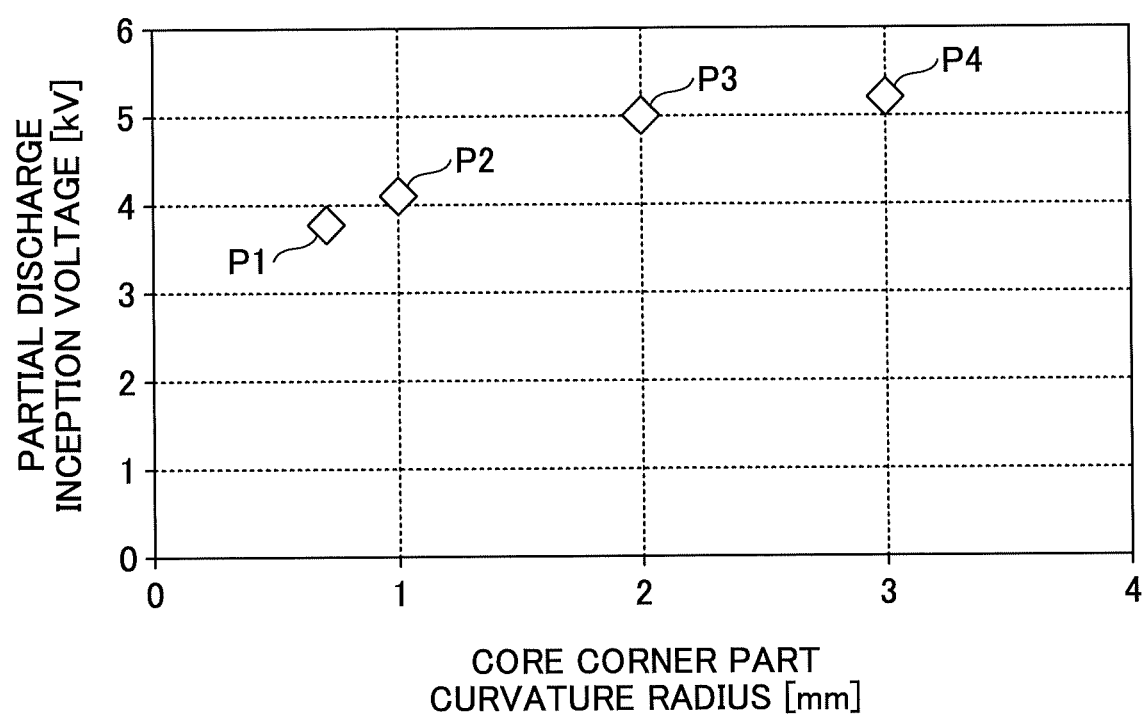
FIG. 3 is a diagram that describes effects of the transformer according to the present embodiment.

FIG. 3 is a diagram that describes the effects of the transformer 1 according to the present embodiment. Specifically, FIG. 3 is a graph illustrating the results of a partial discharge test between the core 10 and the secondary windings 30 and the primary windings 20 with the radius of curvature of the chamfered corner parts 12d of the core 10 as a parameter.

The partial discharge test of FIG. 3 is carried out based on JEC-0401 that is the standard of the Japanese electrotechnical committee of the Institute of Electrical Engineers of Japan (partial discharge measurements) as an example of a predetermined test mode in which a voltage at which partial discharge is started between the primary windings 20 and the core 10 and the secondary windings 30 (a partial discharge inception voltage) is measured when the AC frequency of an applied voltage is 50 Hz and the core 10 and the secondary windings 30 are at the same potential. In each transformer 1 used for the partial discharge test of FIG. 3, the core 10 is made of ferrite, and for specifications related to the dielectric strength, the primary windings 20 are made of three-layer insulated wires, and the bobbins 25 are made of an olefin-based bridge type thermosetting resin.

Note that the results of the partial discharge test vary not only depending on the various characteristics of the core 10, the primary windings 20, and the bobbins 25, but also depending on the dimensions of each part due to the size of the transformer 1 such as the size of the spatial distance between the core 10 (corner parts 12d) and the primary windings 20, for example. Further, plots P1 to P4 in FIG. 3 correspond to cases where the radius of curvature of the corner parts 12d of the core 10 is 0.8 mm, 1.0 mm, 2.0 mm, and 3.0 mm, respectively.

As illustrated by the plots P1 to P3 in FIG. 3, the partial discharge inception voltage increases substantially linearly in accordance with the increase in the radius of curvature of the corner parts 12d of the core 10. Specifically, when the radius of curvature is 0.8 mm and 1.0 mm (plots P1 and P2), the partial discharge inception voltage is approximately 3.8 kV and approximately 4.1 kV, respectively. Conversely, when the radius of curvature is 3.0 (plot P3), the partial discharge inception voltage increases to approximately 5.0 kV. That is, by increasing the radius of curvature of the corner parts 12d of the core 10 from 0.8 mm to 2.0 mm, the dielectric strength against an input voltage is improved by approximately 20%. Generally, as the corner parts 12d are sharpened, electric field concentration easily occurs, and the partial discharge inception voltage between the primary windings 20 and the corner parts 12d of the core 10 becomes relatively low. With respect to the above, the electric field concentration is suppressed by chamfering the corner parts 12d into curved surface shapes to relatively increase the radius of curvature.

With respect to the above, as indicated by the plots P3 and P4, the partial discharge inception voltage increases in accordance with the increase in the radius of curvature of the corner parts 12d of the core 10. Specifically, when the radius of curvature is 3.0 mm (plot P4), the discharge inception voltage increases to approximately 5.2 kV, but the increasing rate of the discharge inception voltage in the range of the radius of curvature corresponding to the plots P3 and P4 is significantly lower than that in the range of radius of curvature corresponding to the plots P1 to P3. That is, in each transformer 1 used for the partial discharge test of FIG. 3, the partial discharge characteristic inception voltage is saturated in the range where the radius of curvature of the corner parts 12d is greater than or equal to 2.0 mm. This is because the electric field concentration is considered to be substantially eliminated when the radius of curvature of the corner parts 12d is increased to a certain extent, and even if the radius of curvature is further increased, it is considered that there is little scope for suppressing the partial discharge due to the electric field concentration.

Therefore, for example, the radius of curvature of the corner parts 12d of the core 10 may be set to be a value within a range where the partial discharge inception voltage is saturated, and may be set to be greater than or equal to 2 mm in this example. This is because the radius of curvature of the corner parts 12d of the core 10 set in the range where the partial discharge inception voltage is saturated is an upper limit level of the effects on the insulation property obtained by chamfering the corner parts 12d of the core 10 into curved surface shapes.

The radius of curvature of the corner parts 12d of the core 10 may be set to satisfy an acceptable value of the partial discharge inception voltage that may be appropriately set from a limit value (withstand voltage) of the dielectric strength required for the transformer 1. For example, when the acceptable value of the partial discharge inception voltage is greater than or equal to 5 kV, the corner parts 12d of the core 10 are preferably chamfered with a radius of curvature of 2 mm or more.

Generally, the acceptable value of the partial discharge inception voltage is set to be a value lower than the withstand voltage to some extent. For example, when the partial discharge inception voltage is greater than or equal to 5 kV, generally, the withstand voltage of the transformer 1 is a value exceeding 5 kV, which is a value capable of sufficiently securing dielectric strength against an input voltage approximately over the entire range of 0 kV to 10 kV. That is, the transformer can secure dielectric strength against a relatively high input voltage of several kV or more by the chamfered corner parts 12d of the core 10 whose radius of curvature is greater than or equal to 2 mm.

As described above, the core 10 of the transformer 1 according to the present embodiment includes the corner parts 12d facing the windings (the primary windings 20) that are wound on the shaft part 11 and to which a relatively high input voltage of several kV or more is applied, and the corner parts 12d are chamfered into curved surface shapes.

Thereby, electric field concentration at the corner parts 12d of the core 10 can be suppressed, and partial discharge between the primary windings 20 and the corner parts 12d of the core 10 can be suppressed. Hence, for the transformer 1 having a size mountable on a printed circuit board, a shortage of the spatial distance between the core 10 and the primary windings 20 for securing dielectric strength can be compensated by the corner parts 12d of the core 10 being chamfered into curved surface shapes. That is, it is possible to achieve both a size reduction and high dielectric strength.

Further, according to the present embodiment, the corner parts 12d of the core 10 are chamfered with a radius of curvature of a predetermined value or more. The predetermined value is defined based on an acceptable value of the partial discharge inception voltage between one (the primary windings 20) of the windings whose voltage is relatively high and the core and the other (the secondary windings 30) of the windings whose voltage is relatively low in the predetermined test mode (such as JEC-0401, for example). In other words, in a case where a first winding and a second winding are wound on a shaft part of a core and a voltage of the first winding is higher than a voltage of the second winding, the corner parts of the core are chamfered with a radius of curvature of a predetermined value or more wherein the predetermined value is defined based on an acceptable value of the voltage of the first winding when partial discharge is started between the first winding and the core and the second winding in a predetermined test mode.

Thereby, the dielectric strength of the transformer 1 can be specifically adapted to the acceptable value of the partial discharge inception voltage.

Further, the core 10 of the transformer 1 according to the present embodiment is chamfered with a radius of curvature of 2 mm or more.

Thereby, as described above, it is possible to secure dielectric strength against a relatively high input voltage of several kV or more.

Further, the transformer 1 according to the present embodiment includes the core 10; the bobbins 25 in which the primary windings 20 wound around the shaft part 11 of the core 10 are sealed by resin; and the secondary windings 30 configured in such a manner that metal plates are wound, around the shaft part 11 of the core 10, by edgewise winding. Further, the plurality of bobbins 25 and the plurality of secondary windings 30 are alternately stacked in the axial direction of the shaft part 11 by a sandwich structure.

Thereby, it is possible to constitute the transformer 1 having a small size that can secure a dielectric strength against a relatively high input voltage of several kV or more.

Configuration of Power Conversion Apparatus Including Transformer

Next, a power conversion apparatus 100 including the transformer 1 according to the present embodiment will be described.

Figure 4:
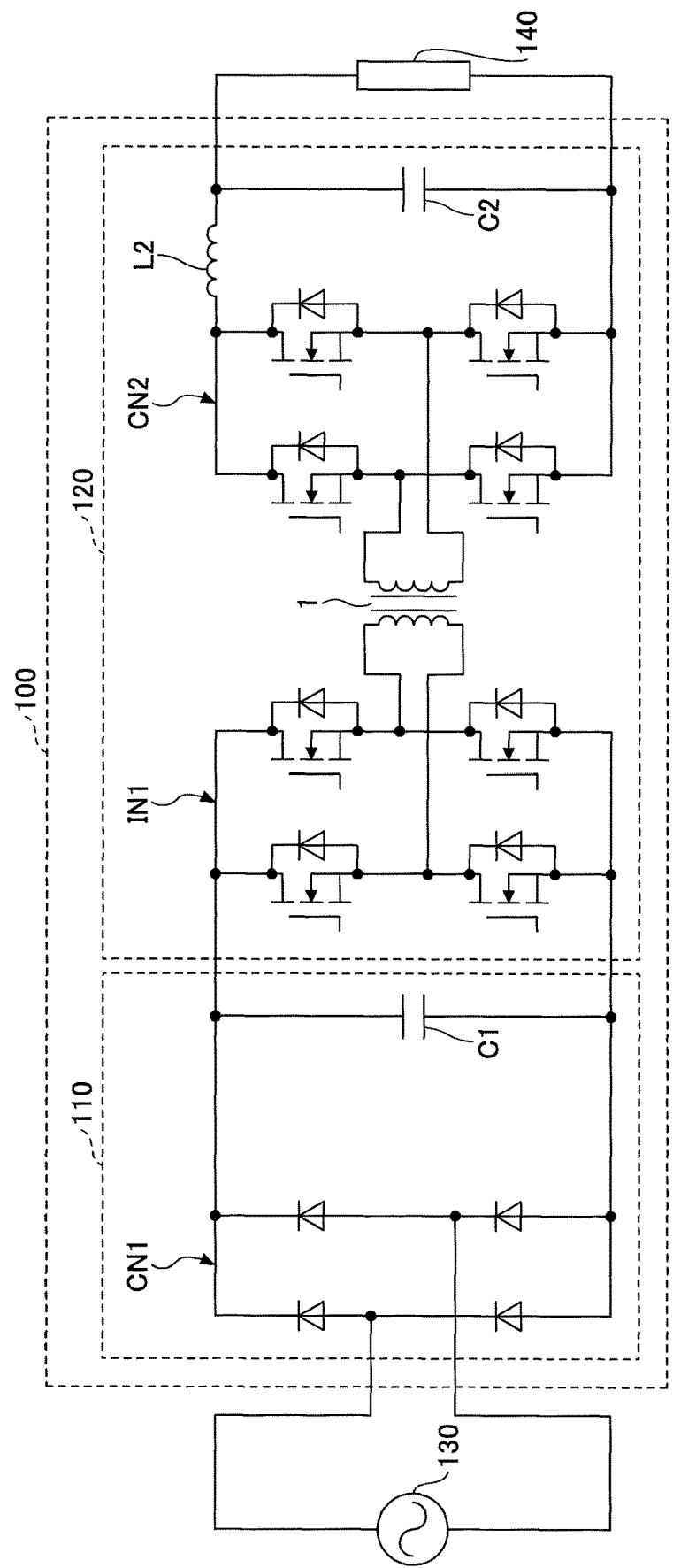
FIG. 4 is a circuit diagram illustrating an example of a power conversion apparatus including the transformer according to the present embodiment.

FIG. 4 is a circuit diagram illustrating an example of the power conversion apparatus 100 including the transformer 1 according to the present embodiment.

Note that in the circuit diagram of FIG. 4, the transformer 1 is illustrated in a simplified manner, and the details of the sandwich structure in which the bobbins 25 (the primary windings 20) and the secondary windings 30 are stacked in the axial direction and the like are not reflected.

The power conversion apparatus 100 is a switching power supply, and converts AC power of a relatively high voltage of several kV or more input from a system AC power supply 130 into DC power of a relatively low predetermined voltage (for example, 100 V) to output and supply the DC power to a load 140 (for example, such as a server computer in a data center or the like). The power conversion apparatus 100 includes an AC-DC converter 110, which converts AC power of the system AC power supply 130 into DC power, and a step-down DC-DC converter 120, which converts the DC power output from the AC-DC converter 110 into DC power of a relatively low predetermined voltage to supply the DC power of the relatively low predetermined voltage to the load 140.

The AC-DC converter 110 includes a converter circuit CN1 and a smoothing capacitor C1.

The converter circuit CN1 is a single-phase full-wave rectifier composed of an H-bridge circuit including four diodes, and converts AC power of the system AC power supply 130 into DC power.

The smoothing capacitor C1 smooths the DC power output from the converter circuit CN1.

The DC-DC converter 120 includes an inverter circuit IN1, the transformer 1, a converter circuit CN2, and a smoothing circuit composed of a reactor L2 and a capacitor C2.

The inverter circuit IN1 is composed of a full bridge circuit including four sets of switching elements and freewheeling diodes connected in parallel, and converts the DC power output from the AC-DC converter 110 into high frequency AC power.

The transformer 1 steps down the high frequency AC power output from the inverter circuit IN1 to a predetermined AC voltage. Because a step-down operation is not performed in a prior stage of the transformer 1 in the power conversion apparatus 100, a relatively high voltage of several kV or more is applied to the transformer 1. Specifically, the relatively high voltage is applied to the primary windings 20.

The converter circuit CN2 is composed of a full bridge circuit including four sets of switching elements and freewheeling diodes connected in parallel, and converts the AC power output from the transformer 1 into DC power having a predetermined voltage.

The smoothing circuit including the reactor L2 and the capacitor C2 smooths the output voltage of the converter circuit CN2 and outputs the smoothed output voltage to the load 140.

As described above, a small transformer 1 having relatively high dielectric strength of several kV or more is used. Thereby, it is possible to realize, in a facility such as a data center, a power supply system (the power conversion apparatus 100) that directly receives a relatively high voltage of several kV or more and outputs DC power of a relatively low predetermined voltage to a load such as a server computer.

Although the embodiment for implementing the present invention has been described above in details, the present invention is not limited to the embodiment specifically disclosed and various variations and modifications may be made without departing from the scope of the present invention recited in the claims.

Variation Example

For example, although a PQ core (see FIGS. 1 and 2) is described as an example in the embodiment described above, corners parts, facing primary and secondary windings, of other shapes of cores (e.g., an EI core, an EE core, an EP core, an RM core, etc.) may be similarly chamfered. In such a case, similar effects can be achieved.

Further, for example, although the radius of curvature of the chamfered curved surface at the corner parts 12d of the core 10 is constant over the entire region in the embodiment described above, the radius of curvature may be changed in a stepwise or continuous manner. Further, for example, although the four corner parts 12d of the core 10 are respectively chamfered into curved surfaces in the embodiment described above, the number of corner parts chamfered into curved surfaces may be one or more.

Further, for example, although a step-down transformer that steps down a relatively high input voltage of several kV or more is described as an example in the embodiment described above, conversely, a step-up transformer that outputs a relatively high output voltage of several kV or more may be used. In such a case as well, corner parts of a core facing windings (specifically, secondary windings of a relatively high voltage) are similarly chamfered. Thereby, with respect to the relatively high output voltage, it is possible to suppress electric field concentration at the corner parts of the core facing the windings, that is, to suppress partial discharge between the corner parts and the secondary windings, and to secure high dielectric strength.

What is claimed is:

1. A core for a transformer, the core comprising:
   a shaft part having a cylindrical shape; and
   a pair of leg parts provided at both sides with respect to the shaft part, each of the leg parts having an inner surface that is curved to face a winding wound on the shaft part,
   wherein each of the leg parts has, on both ends of the inner surface, inner corner parts that are chamfered,
   wherein each of the leg parts has a flat outer surface and connection surfaces that are orthogonal to the flat outer surface and that connect the flat outer surface and the corner parts to form right-angle outer corner parts,
   wherein the inner surface and the inner corner parts of each of the leg parts are curved in different directions,
   wherein the winding includes a first winding and a second winding and a voltage of the first winding is higher than a voltage of the second winding, and
   wherein the inner corner parts of each of the leg parts are chamfered with a radius of curvature of 2 mm or more so that a partial discharge start voltage between the first winding, the core and the second winding is greater than or equal to 5 kV.

2. The core according to claim 1,
   wherein the corner parts are chamfered based on an acceptable value of the voltage of the first winding when partial discharge is started between the first winding and the core and the second winding in a predetermined test mode.

3. A transformer comprising:
   the core according to claim 1;
   wherein the first winding includes primary windings, and the second winding includes a plurality of secondary windings;
   a plurality of bobbins in which the primary windings wound around the shaft part are sealed by resin; and
   the plurality of secondary windings configured such that metal plates are wound, around the shaft part, by edgewise winding,
   wherein the plurality of bobbins and the plurality of secondary windings are alternately arranged in an axial direction of the shaft part.

* * * * *